Figure 5:
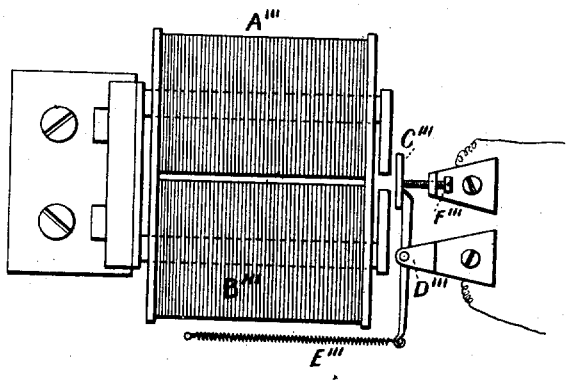

BEST AVAILABLE COPY
2 Sheets—Sheet 1.
P. A. J. DUJARDIN.
Assignor to the Gold and Stock Telegraph Co.
PRINTING TELEGRAPH.
No. 7,627. Reissued April 24, 1877.
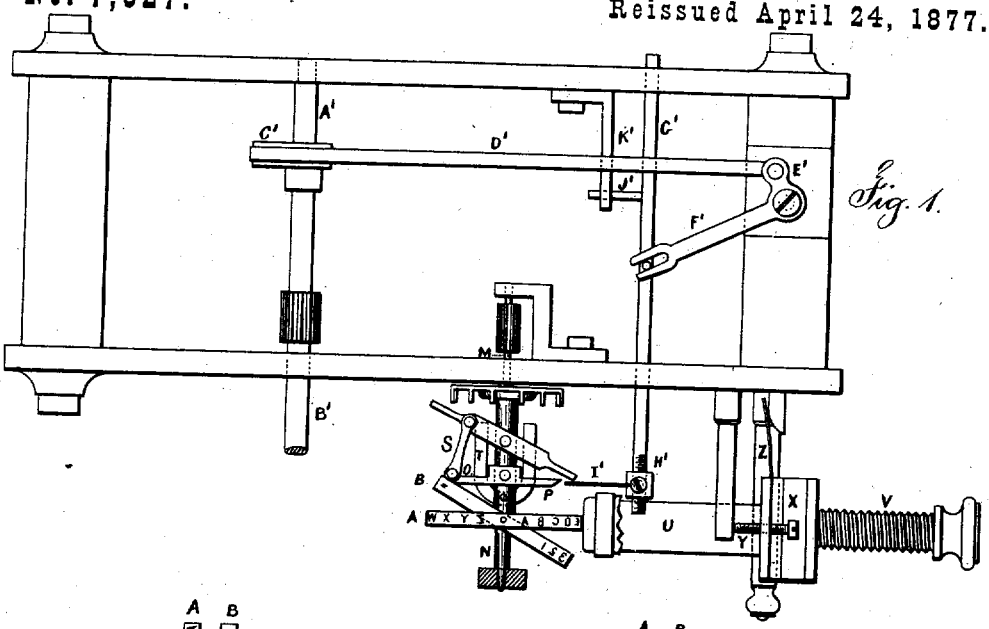
Fig. 1.
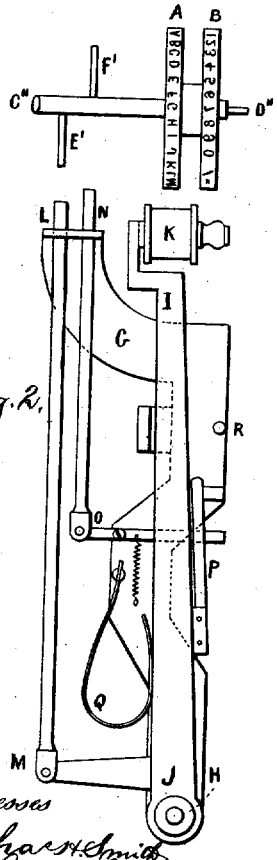
Fig. 2.
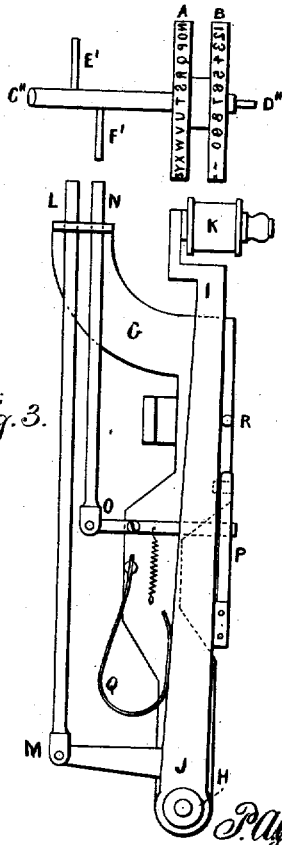
Fig. 3.
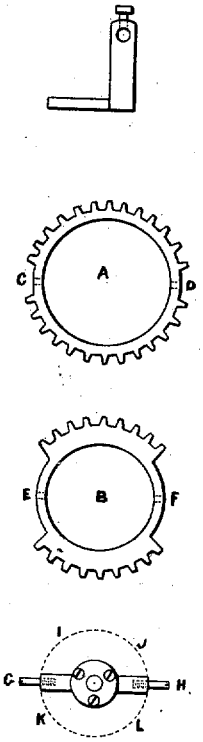
Witnesses
Chas. H. Smith
Harold Serrell.
Inventor
P. A. J. Dujardin.
per L. W. Serrell
Atty
THE NORRIS PETERS CO., PHOTO-LITHO., WASHINGTON, D. C.

2 Sheets—Sheet 2.

P. A. J. DUJARDIN.

Assignor to the Gold and Stock Telegraph Co.

PRINTING TELEGRAPH.

No. 7,627.

Reissued April 24, 1877.

Witnesses

Chas. H. Smith

Harold Serrell

Inventor.

P. A. J. Dujardin.

per L. W. Serrell

Atty.

THE NORRIS PETERS CO., PHOTO-LITHO., WASHINGTON, D. C.

UNITED STATES PATENT OFFICE.

PIERRE A. J. DUJARDIN, OF LILLE, FRANCE, ASSIGNOR TO THE GOLD AND STOCK TELEGRAPH COMPANY, OF NEW YORK CITY.

IMPROVEMENT IN PRINTING-TELEGRAPHS.

Specification forming part of Letters Patent No. 82,502, dated September 29, 1868; reissue No. 7,627, dated April 24, 1877; application filed November 20, 1876.

*To all whom it may concern:*

Be it known that I, PIERRE ANTOINE JOSEPH DUJARDIN, physician, of Lille, France, have invented Improvements in Printing-Telegraphs; and I do hereby declare that the following is a full, clear, and exact description of the same.

Printing-telegraphs have been made with a type-wheel that is revolved by a train of gearing or clock-work, and an escapement has been applied, under the control of an electro-magnet, to allow the type-wheel to be revolved by a step-by-step motion; and the impression has been given by an electro-magnet, separately operated after the type-wheel has been set.

I make use of two type-wheels, one of which contains letters and the other contains figures. They are arranged so that the impression can be taken from either one or the other, a motion being given to either the type-wheels or the impression-pad, to shift the impression from one type-wheel to the other.

The means for shifting are operated by the movement of the printing-lever. The main-line current serves to produce the movement of the impression-lever through the agency of an electro-magnet.

Figure 1 is a top view of the receiving apparatus, in which A and B are two type-wheels in a ring shape. A is the letter-wheel, and B the figure or other complemental-mark wheel.

The letter-wheel A has, at C D, two holes formed through both ends of one of its diameters; and the figure-wheel B has, at E F, two similar perforations through the two ends of one of its diameters.

The wheel B is made to enter the wheel A, so that the holes C E and D E may coincide. A and B are made to cross over one another, and are secured to each other by rivets.

I J K L represent a metallic disk, fitting exactly within the wheel B. This disk being placed within the wheel B, two screw-cut holes are pierced in its periphery, through the apertures E F, into which holes are engaged headless screws G H, upon which the cross-wheels are pivoted The disk is so cut out as to only preserve a central ground and two spokes, both ground and spokes constituting the rocking axis of the cross-wheels.

The cross-wheels thus prepared are fixed on one of the shafts or arbors of a train of gearing or clock-work, whereby the type-wheels are rotated. A piece of steel, O P, serving as a stop to the cross-wheel, is screwed on M N, and a double lever, Q R, is securely fitted in a slide formed in M N. A connecting-rod, S, is jointed to the double lever and the figure-wheel. A horseshoe-like spring, T, presses on the two ends of the double lever, so as to give the cross-wheels proper steadiness.

I will now describe the mechanism whereby the cross-wheels are made to oscillate. A′ B′ is the last driven axis of the clock-work, which serves for printing. It makes a complete revolution every time a type is printed. It carries an eccentric, C′, which, through the connecting-rod D′ and the bell-crank or bent lever E′ F′, causes a to-and-fro motion to be made by the rod G′ H′, which is elbowed at H′, and terminated by a spring, I′. A pin, J′, fixed into shaft G′ H′, and sliding in a groove formed in the knee K′, serves to maintain G′ H′ in an invariable direction.

When, by means of the transmitter of the apparatus, the shaft G′ H′ is turned, and one of the double-lever ends Q R is placed in the path of the spring I′, the printing action causes the oscillation of the cross-wheels in one direction, until they are stopped by the stop-piece O P.

The inking plug or apparatus consists of a tube, U, Fig. 1, to the end of which is applied a piece of velvet, fixed thereto by means of a ring, and inside which tube enters a piston and screw, V, a thick leather washer, X, fixed by rivets to the mouth of the tube U, serving as a female screw to admit the screw V. The plug is set on an axis, on which it is free to rock, an adjusting-screw, Y, and its abutment allowing of the plug being brought more or less close to the type-wheels, so that the nap only, and never the foundation of the fabric itself, can touch the wheels. A spring, Z, throws said plug on the type-wheels.

In the tube U I put some cotton impregnated with an oleic ink, and by means of piston V the ink is made to ooze through the velvet gradually and as wanted.

In Figs. 2 and 3, which are views of a modification of the impression mechanism, A B represent face views of parallel type-wheels. These are fixed on C″ D″, one of the shafts in the train of gearing, whereby they are caused to rotate.

Two pins, E′ F′, driven into C″ D″, cause the rocking action of the impression-pad.

G H, metallic blade attached to the printing-lever. (Not shown.) At the lower part of the blade, at H, is a pivot, on which is fitted another blade, I J. The printing-pad K, over which passes the strip of paper, is fixed to the top part of the blade I J.

L M N O are two connecting-rods, abutting on pins E′ F′, to procure the rocking motion of the blade I J, and consequently of the pad K. The rod L M causes the plug to oscillate to the left, and places it under the type-wheel, as shown at Fig. 2. The spring P, fixed on I J, clamps, by means of a little stop, the blade I J on the blade G H, so as to retain it in position, while the rod N O, by raising the spring P, unlocks the blade I J, which, on being released and pressed on by the main-spring Q, oscillates to the right so far as the stop R, and thus places the plug under the figure-wheel, as shown at Fig. 3, which is no other than Fig. 2 reproduced. All the constituent pieces of this system are preferably made of aluminium, so as not to overweight the printing-lever.

Figure 4:
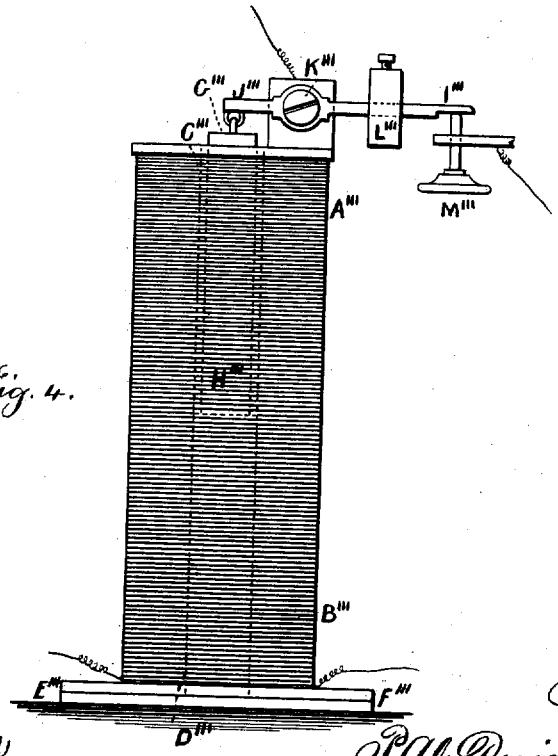

Fig. 4 represents a side elevation of an electro-magnet as distributer of printing-currents.

A‴ B‴ is a vertical thin-wire coil, through which the main-line current passes. Inside the same is fixed a soft-iron cylinder, C‴ D‴, terminated at its lower part by a soft-iron washer, E‴ F‴. Another cylinder, G‴ H‴, of similar metal, hollow, and thinner than C‴ D‴, is suspended above C‴ D‴ from the end of the lever I‴ J‴, oscillating about the point K‴. This lever is provided with a movable counter-weight, L‴, for which may be substituted a reacting-spring.

The end I‴ of the lever is abutting against the adjusting-screw M‴.

The local current, which serves for printing, enters the lever I‴ J‴ at K‴, and is conveyed through the regulating-screw to the printing electro-magnet. I judge it proper to observe here that the type-wheels of my receiving apparatus rotate, preferably, by the action of alternate positive and negative currents succeeding each other without any perceptible interruption, and that printing is produced by cutting off or arresting the line-current corresponding to the type which is to be printed.

Now, when it is desired to set the type-wheels in motion, the iron cylinder G‴ H‴ is drawn continuously by the cylinder C‴ D‴, and the local or printing current is cut off at I‴ M‴. When the line-current is cut off, G‴ H‴ being no longer attracted by C‴ D‴, the lever I‴ J‴ falls back on M‴. On the local current passing into the electro-magnet, printing is produced. As soon as the current is returned to the line the local current is broken, and so on.

Fig. 5 represents another form of electro-magnet for distributing the printing-currents.

A‴ B‴ is a thin-wire electro-magnet run through by the line-currents. The pallet C‴ is very light, and so is its rod; it oscillates about the point D‴. E‴ is its reacting-spring. F‴ is both an abutment and adjusting screw.

The local current enters the system through the support of the screw F‴, and goes out through the support of the armature C‴.

When the type-wheels are set in motion, the pallet C‴ is attracted by the electro-magnet A‴ B‴, and the local current is broken at F‴.

When the line-current is cut off, the armature, being no longer drawn, rushes on the screw F‴, and gives passage to the local current, whereby printing is effected.

When the current is returned to the line, the armature C‴ cuts off the local current, and so forth.

In consequence of the type-wheels being rotated by the clock-work aforesaid, and also using the clock-work as the motor in effecting the printing, the motive power is mechanical, and the electric power that controls these operations can be much less than in the printing-telegraphs where either the rotation of the type-wheel or the printing is effected by the direct action of magnetism; furthermore, the electric connections are not liable to become deranged, even when a large number of machines are connected in one main-line circuit, because all the connections are complete and metallic through all the magnets, and the separate magnet that serves to control the printing is independent of the type-wheel magnet; hence the magnets can be easily adjusted, and there is no risk of the printing coming into action at the wrong time.

Furthermore, the battery-power, in proportion to the number of instruments in the circuit, will be lessened by the propelling power of the clock-work in each instrument performing the printing and moving the type-wheel.

I claim as my invention—

1. The combination, with the printing-lever and two type-wheels, of mechanism for shifting the impression from one type-wheel to the other at certain positions of the type-wheels, substantially as set forth.

2. The impression-pad and shifting-pins F′ E′, in combination with the two type-wheels A B and printing-lever, substantially as set forth.

3. In a printing-telegraph, two adjacent type-wheels, an impression-pad, and shifting mechanism under the control of the printing-magnet, for changing the impression from one type-wheel to the other.

4. In a printing-telegraph, one or more type-wheels, an electro-magnet and its armature, acting by alternate positive and negative currents to set the type-wheel, in combination with a separate electro-magnet included in the main line, its armature, and the printing mechanism, which are brought into action by cessation in the reversal of the currents, substantially as set forth.

Signed by me this 29th day of March, A. D. 1876.

P. A. J. DUJARDIN.

Witnesses:
E. RUJEEL,
ENTHILLOINS.